United States Patent
Hirota et al.

(10) Patent No.: US 11,267,424 B2
(45) Date of Patent: Mar. 8, 2022

(54) DAMPER MECHANISM OF STEERING WHEEL AND STEERING WHEEL APPARATUS FOR VEHICLE

(71) Applicant: Autoliv Development AB, Vargarda (SE)

(72) Inventors: Yutaka Hirota, Kanagawa (JP); Kazuhiro Abe, Kanagawa (JP); Hiroyoshi Shimono, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 202 days.

(21) Appl. No.: 16/508,864

(22) Filed: Jul. 11, 2019

(65) Prior Publication Data

US 2020/0017057 A1 Jan. 16, 2020

(30) Foreign Application Priority Data

Jul. 11, 2018 (JP) .............................. JP2018-131806
Aug. 9, 2018 (JP) .............................. JP2018-150732
May 7, 2019 (JP) .............................. JP2019-087698

(51) Int. Cl.
*B60R 21/203* (2006.01)

(52) U.S. Cl.
CPC ................ *B60R 21/2037* (2013.01)

(58) Field of Classification Search
CPC .............. B60R 21/203; B60R 21/2037; B60R 21/21658

See application file for complete search history.

(56) References Cited

U.S. PATENT DOCUMENTS

| 5,239,147 | A | * | 8/1993 | Allard | B60R 21/2037 200/61.54 |
| 5,350,190 | A | * | 9/1994 | Szigethy | B60Q 5/003 200/61.55 |
| 5,410,114 | A | * | 4/1995 | Furuie | B60Q 5/003 200/61.55 |
| 5,762,359 | A | * | 6/1998 | Webber | B60R 21/2035 280/728.2 |
| 5,810,535 | A | * | 9/1998 | Fleckenstein | B60R 21/20 411/522 |

(Continued)

FOREIGN PATENT DOCUMENTS

| JP | 2014237425 | 12/2014 |
| JP | 2015512831 | 4/2015 |

(Continued)

*Primary Examiner* — Barry Gooden, Jr.
(74) *Attorney, Agent, or Firm* — Stoel Rives LLP

(57) ABSTRACT

Problem: To provide a damper mechanism of a steering wheel and a steering wheel apparatus for a vehicle in which it is possible to ensure a damping effect comparable to that of the known art and to decrease an airbag module in size so as to achieve a reduction in cost.
Solution: A damper mechanism of a steering wheel includes: two damper units 11 that are provided between a steering wheel 1 and an airbag module 2 functioning as a damper mass and damp vibration of the steering wheel; and an engaging mechanism (hook of a plate-shaped damper 18) that is provided in parallel with the damper unit, between the steering wheel and the airbag module, and holds the steering wheel and the airbag module in a relatively displaceable manner.

22 Claims, 15 Drawing Sheets

(56) References Cited

U.S. PATENT DOCUMENTS

| | | | | |
|---|---|---|---|---|
| 5,924,831 | A * | 7/1999 | Ricks | F16B 21/086 411/508 |
| 5,931,492 | A * | 8/1999 | Mueller | B60Q 5/003 280/728.2 |
| 6,082,758 | A * | 7/2000 | Schenck | B60Q 5/003 200/305 |
| 6,257,615 | B1 * | 7/2001 | Bohn | B60Q 5/003 200/61.54 |
| 6,592,141 | B1 * | 7/2003 | Dancasius | B60R 21/2037 280/728.1 |
| 7,118,125 | B2 * | 10/2006 | Lee | B60Q 5/003 280/731 |
| 7,976,059 | B2 * | 7/2011 | Fujita | B60R 21/2037 280/731 |
| 8,985,623 | B2 * | 3/2015 | Kondo | F16F 7/1028 280/731 |
| 9,139,150 | B2 * | 9/2015 | Oh | B60R 21/203 |
| 9,580,034 | B2 * | 2/2017 | Saito | B60R 21/21658 |
| 9,884,603 | B2 * | 2/2018 | Kim | B60R 21/2037 |
| 10,196,028 | B2 * | 2/2019 | Yamami | B60R 21/2037 |
| 2002/0124682 | A1 * | 9/2002 | Schutz | B60R 21/2037 74/552 |
| 2005/0230942 | A1 * | 10/2005 | Erlingstam | B60R 21/2035 280/731 |
| 2006/0175816 | A1 * | 8/2006 | Spencer | B60R 21/2037 280/731 |
| 2006/0197323 | A1 * | 9/2006 | Pillsbury | B60Q 5/003 280/731 |
| 2013/0026741 | A1 * | 1/2013 | Onohara | B60R 21/2037 280/731 |
| 2013/0076011 | A1 * | 3/2013 | Umemura | B60Q 5/003 280/728.2 |
| 2013/0239739 | A1 * | 9/2013 | Miyahara | B60R 21/2037 74/552 |
| 2015/0042079 | A1 * | 2/2015 | Ishii | B60Q 5/003 280/728.2 |
| 2015/0069739 | A1 * | 3/2015 | Oh | B60R 21/2037 280/728.2 |
| 2015/0210308 | A1 * | 7/2015 | Onohara | B60Q 5/003 200/61.54 |
| 2017/0036687 | A1 * | 2/2017 | Obayashi | B62D 1/04 |
| 2018/0111580 | A1 * | 4/2018 | Sella | B60R 21/2037 |
| 2020/0043679 | A1 * | 2/2020 | Nonoyama | B60R 21/2037 |
| 2020/0139917 | A1 * | 5/2020 | Funk | B60R 21/2035 |
| 2020/0148155 | A1 * | 5/2020 | Kwon | B60R 21/2037 |
| 2020/0346605 | A1 * | 11/2020 | Hirota | B62D 7/222 |
| 2021/0031684 | A1 * | 2/2021 | Matsuo | B62D 1/04 |
| 2021/0039704 | A1 * | 2/2021 | Kiyohara | B62D 1/11 |
| 2021/0269080 | A1 * | 9/2021 | Kim | B62D 1/10 |

FOREIGN PATENT DOCUMENTS

| | | |
|---|---|---|
| JP | 2017178094 | 10/2017 |
| KR | 20170053945 | 5/2017 |

* cited by examiner

[FIG. 1]
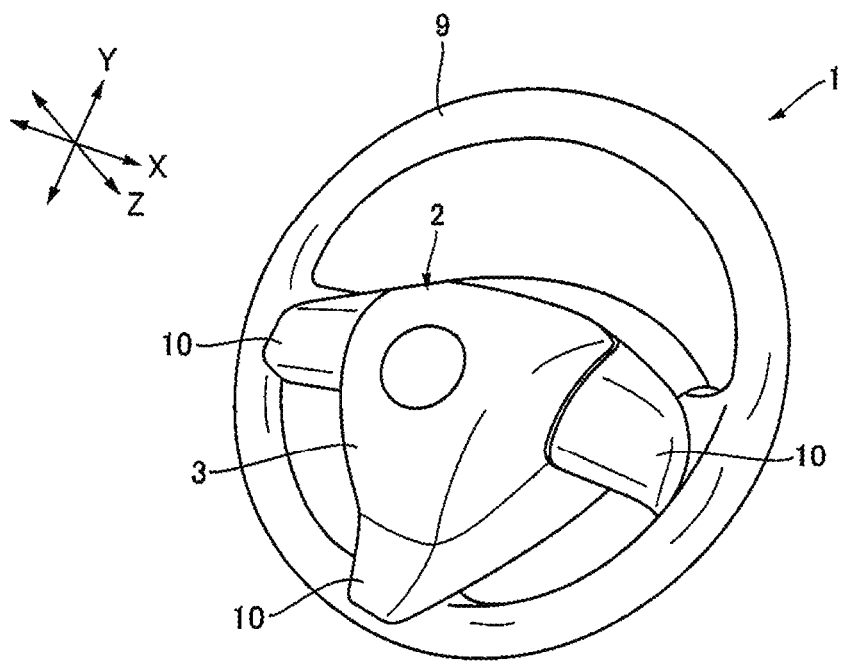

[FIG. 2]
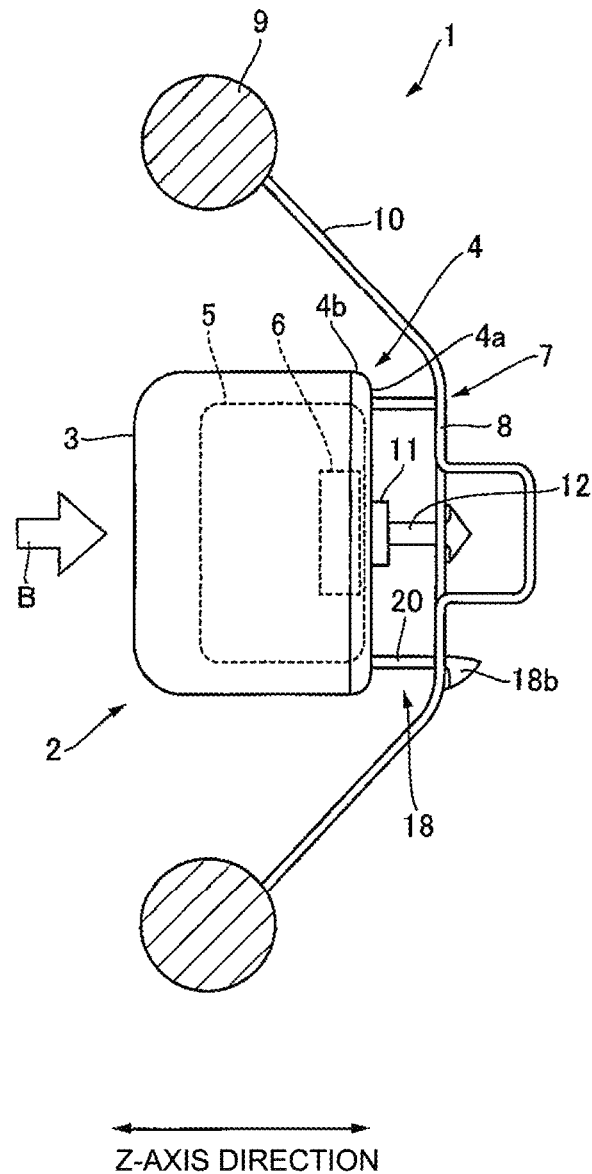
Z-AXIS DIRECTION

[FIG. 3]
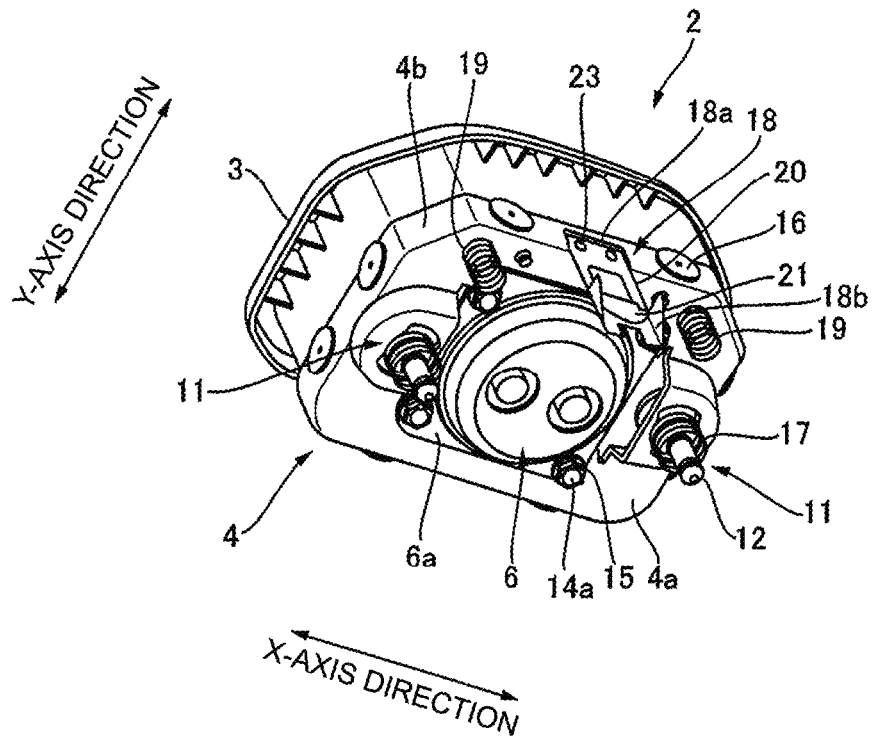
[FIG. 4]
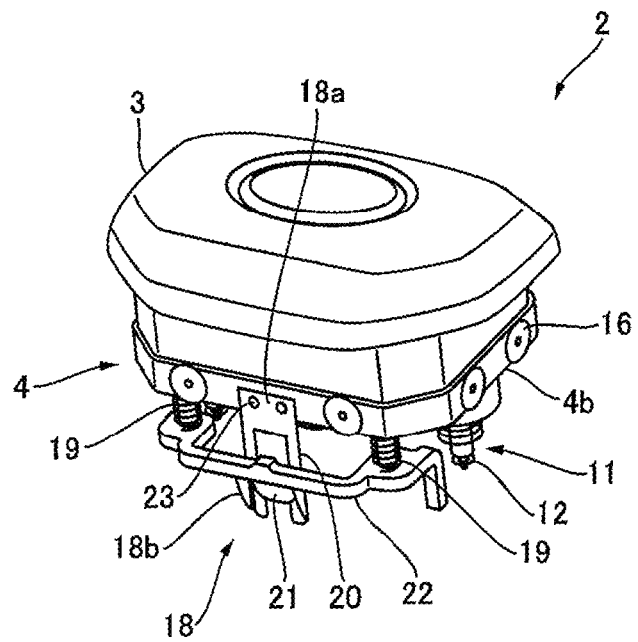

[FIG. 5]
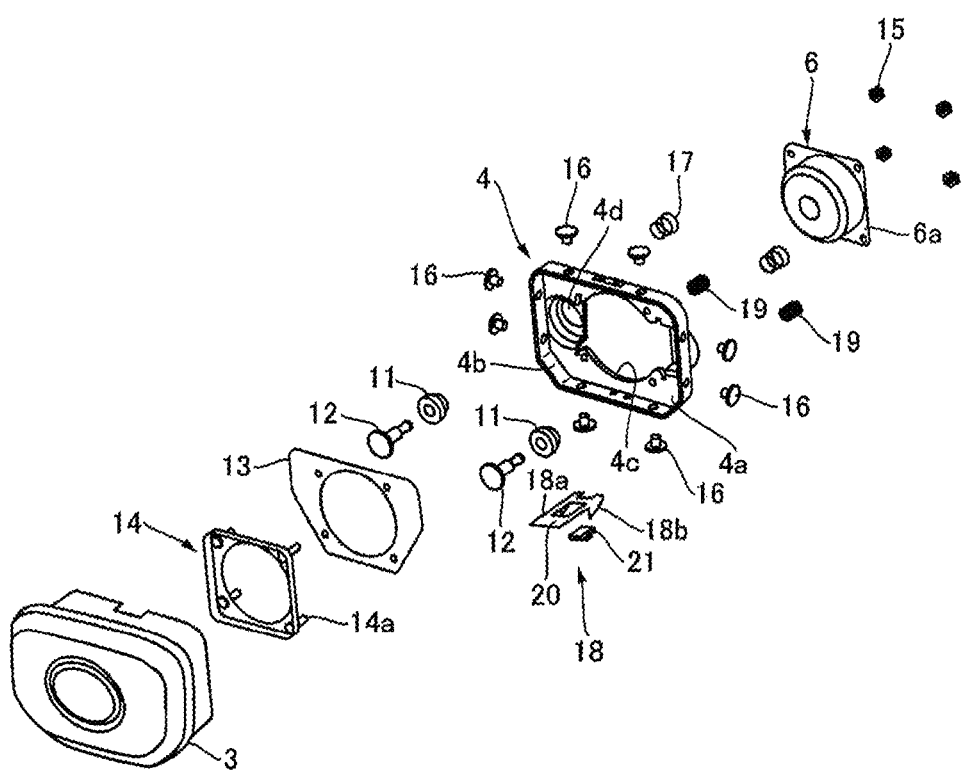

[FIG. 6]
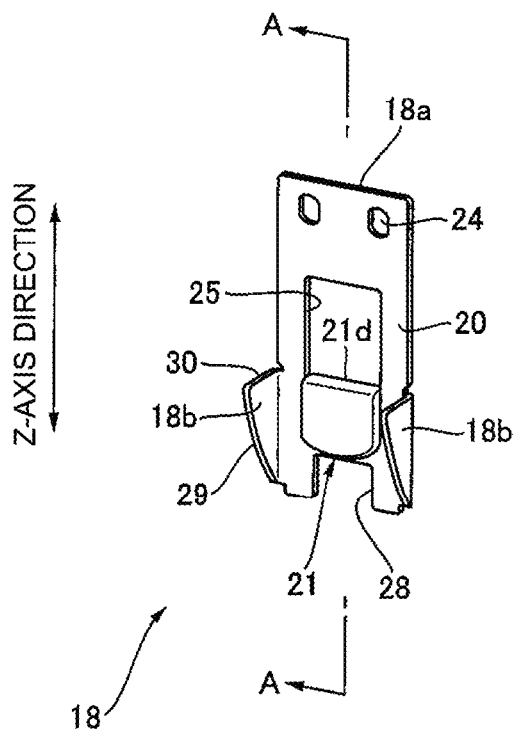
[FIG. 7]
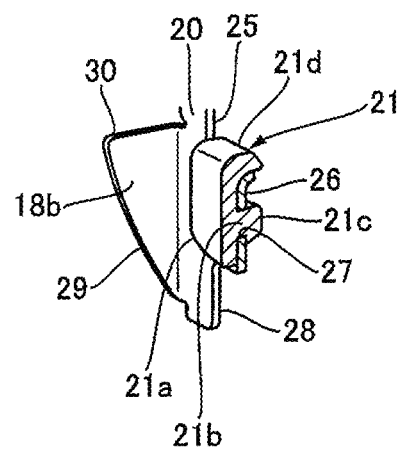

[FIG. 8]
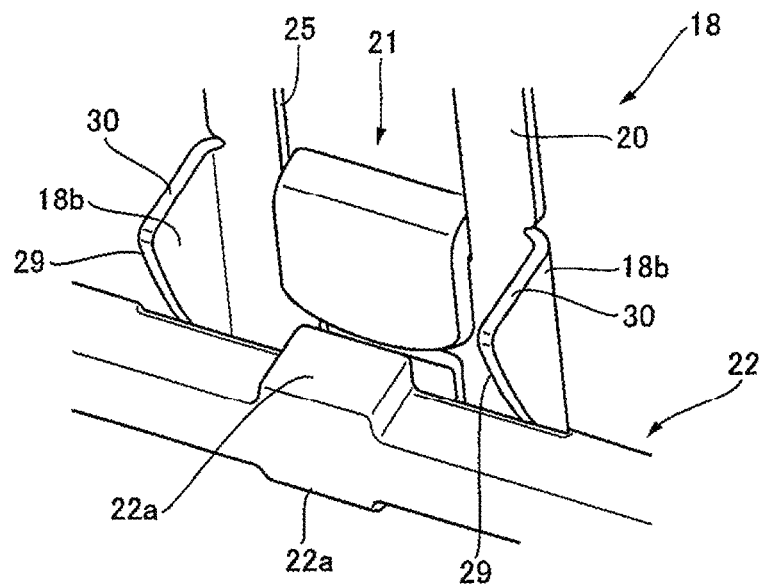
[FIG. 9]
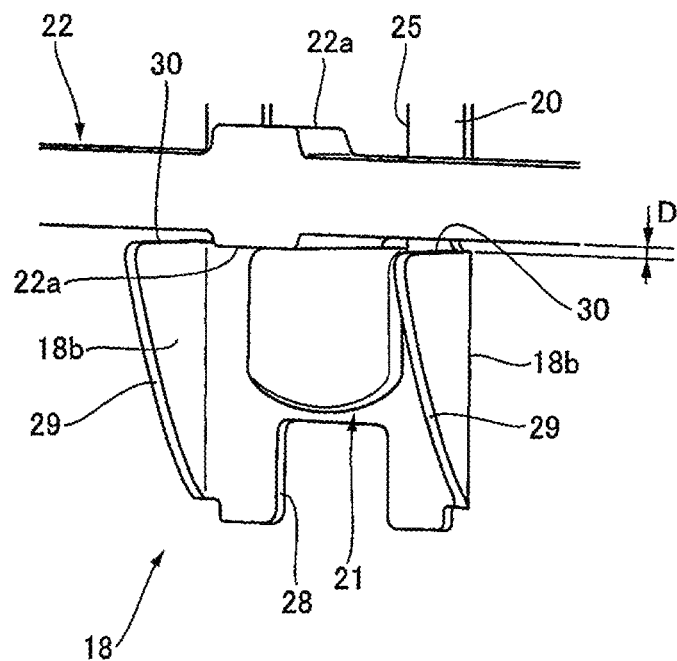

[FIG. 10]
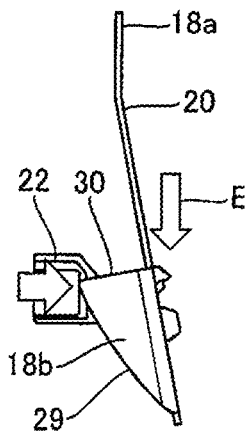
[FIG. 11]
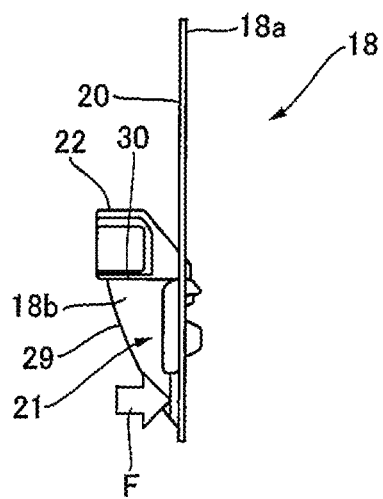

[FIG. 12]
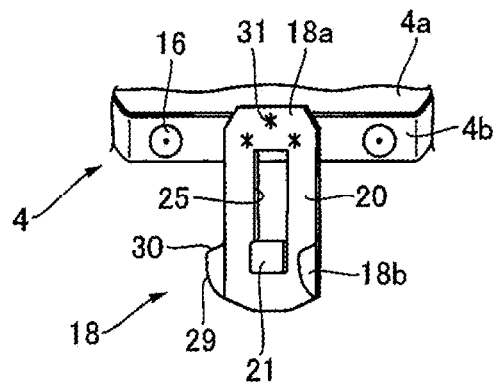
[FIG. 13]
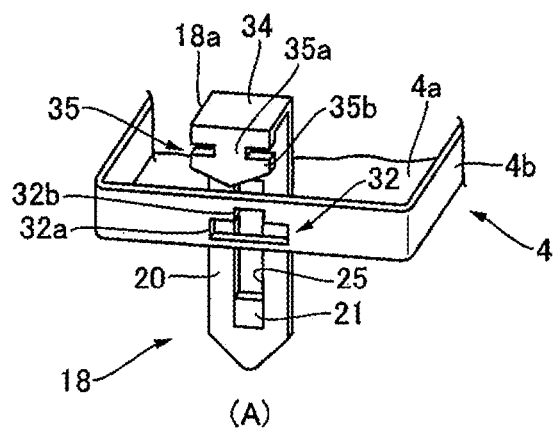
(A)
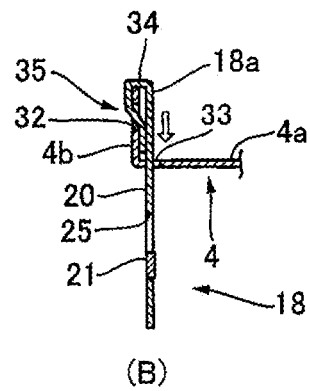
(B)

[FIG. 14]
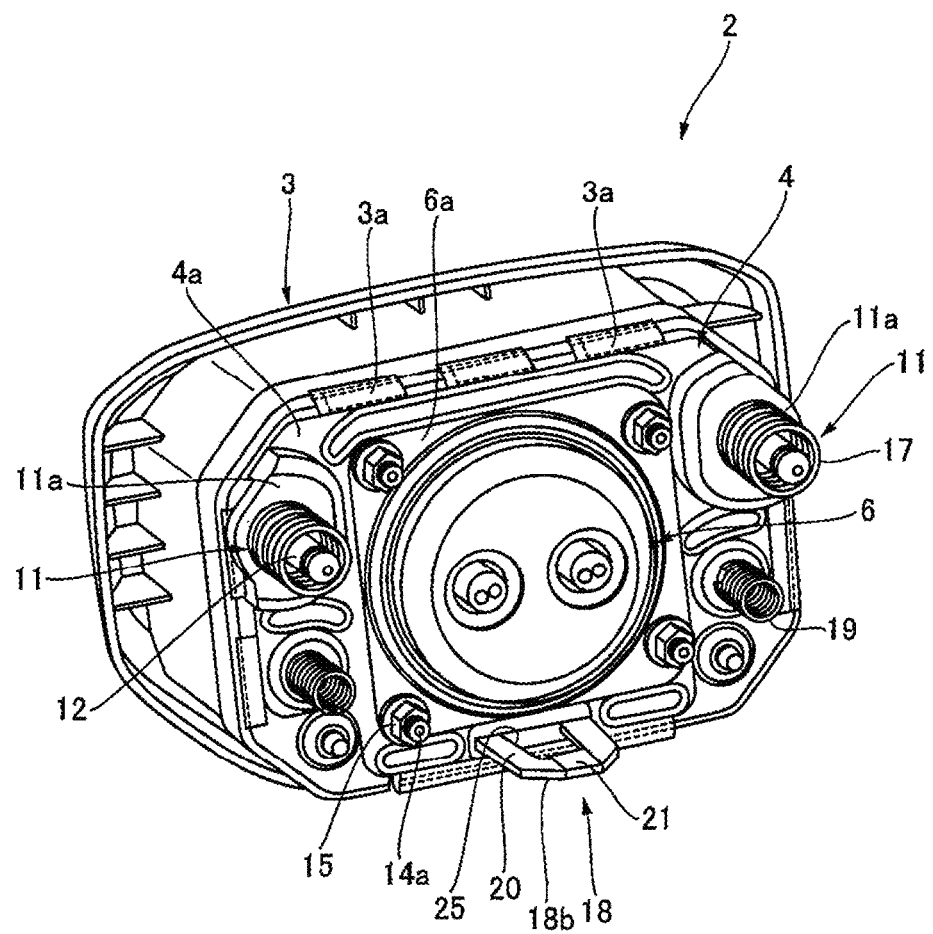

[FIG. 15]
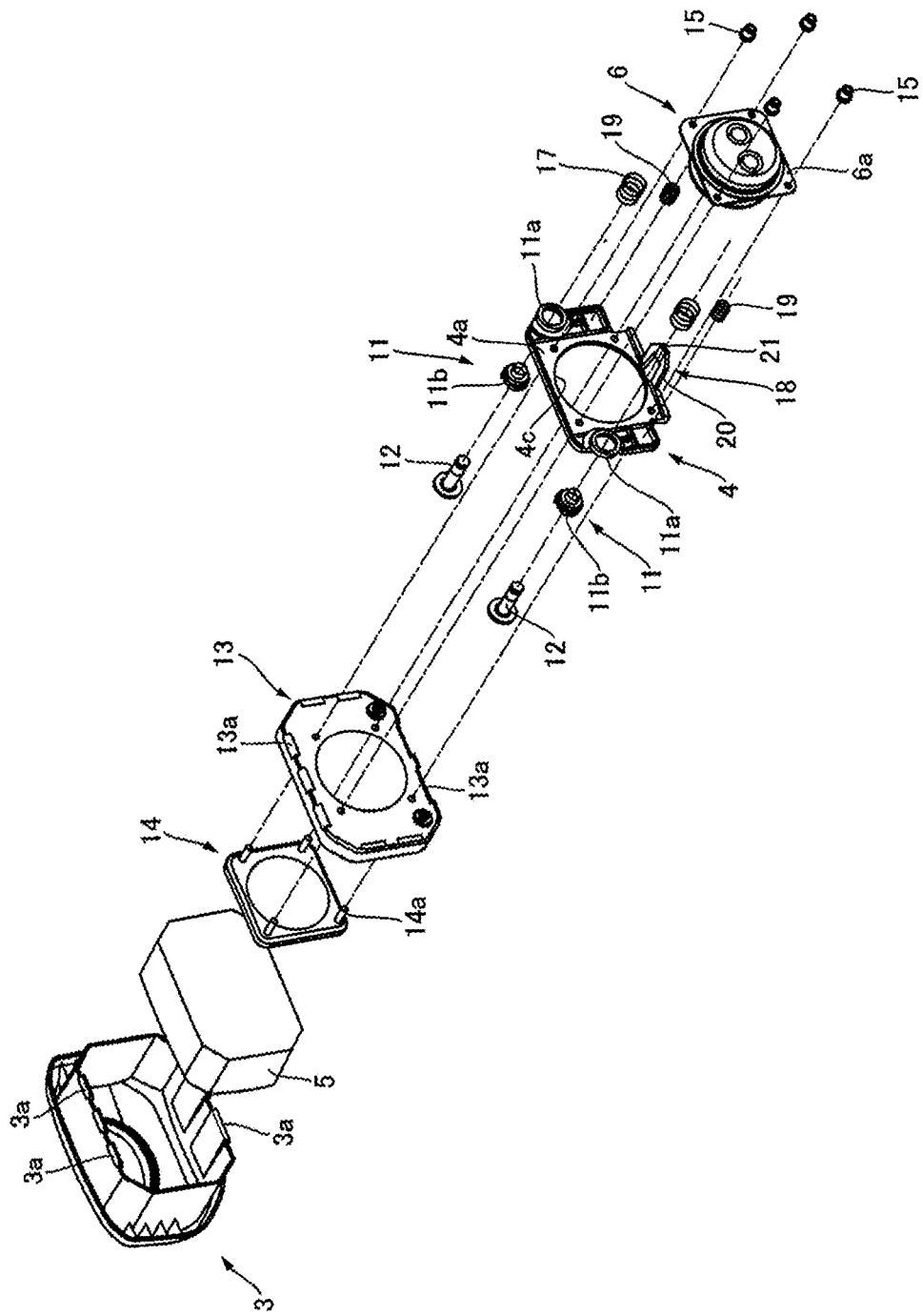

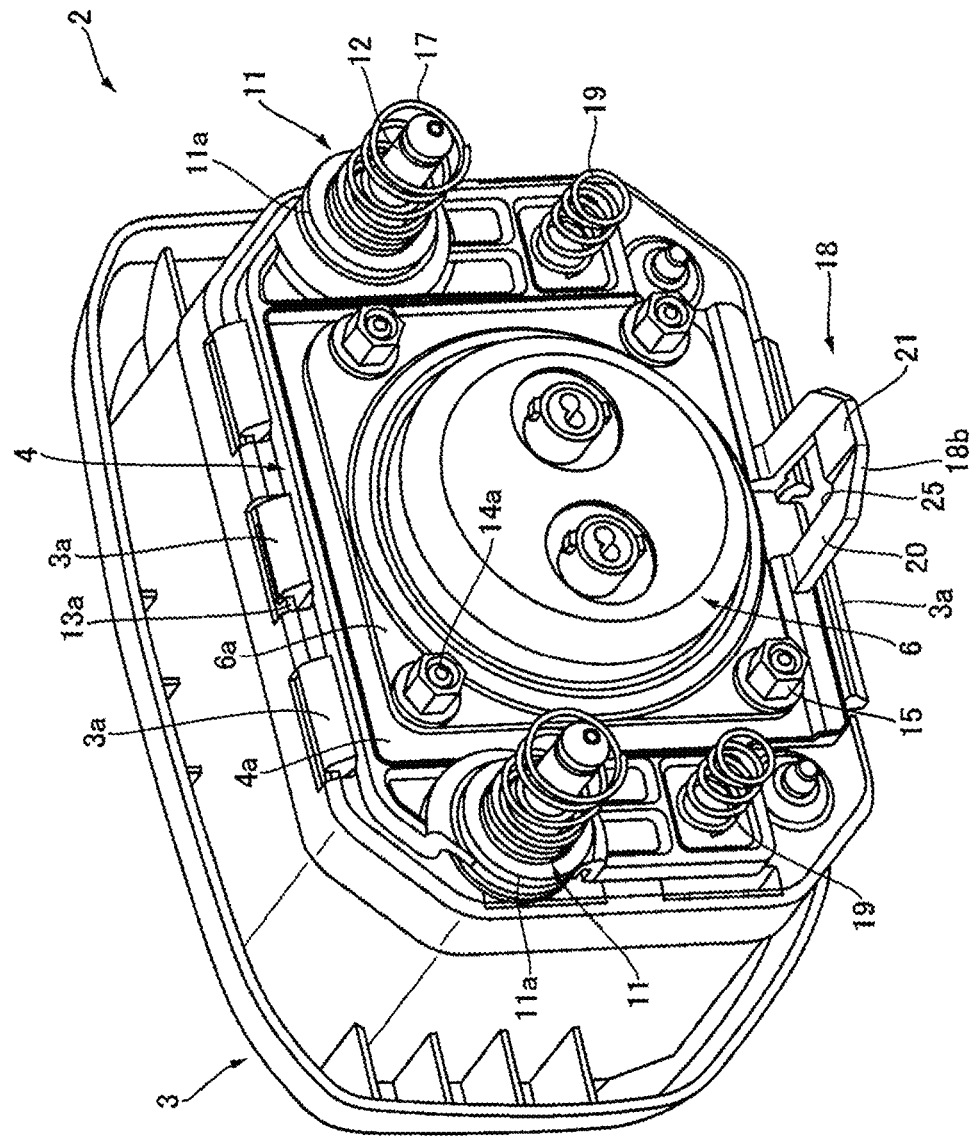
[FIG. 16]

[FIG. 17]
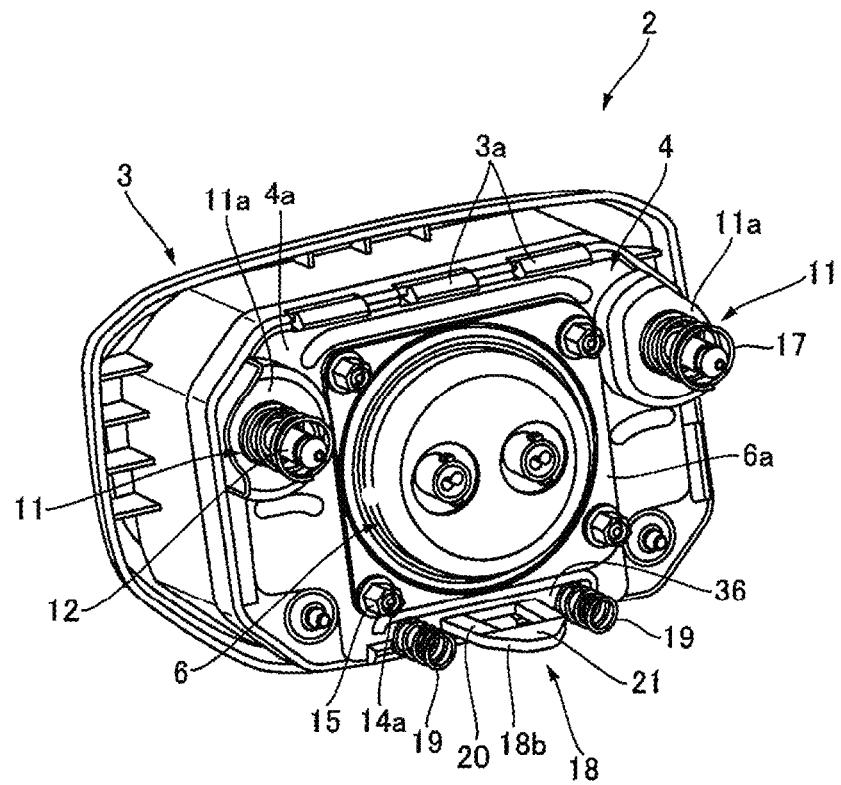
[FIG. 18]
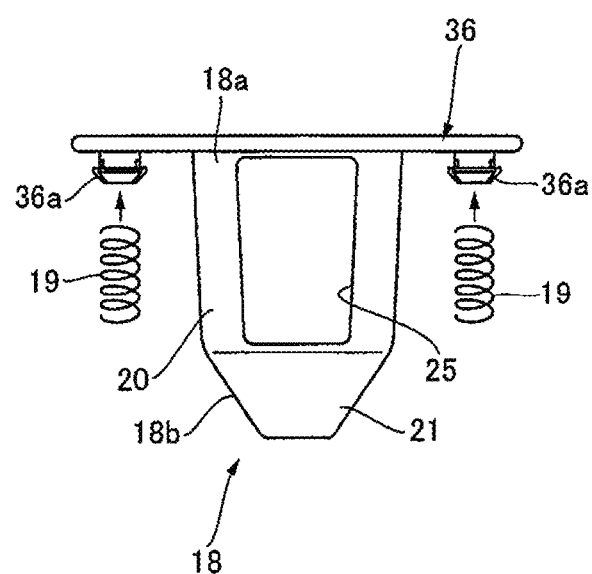

[FIG. 19]
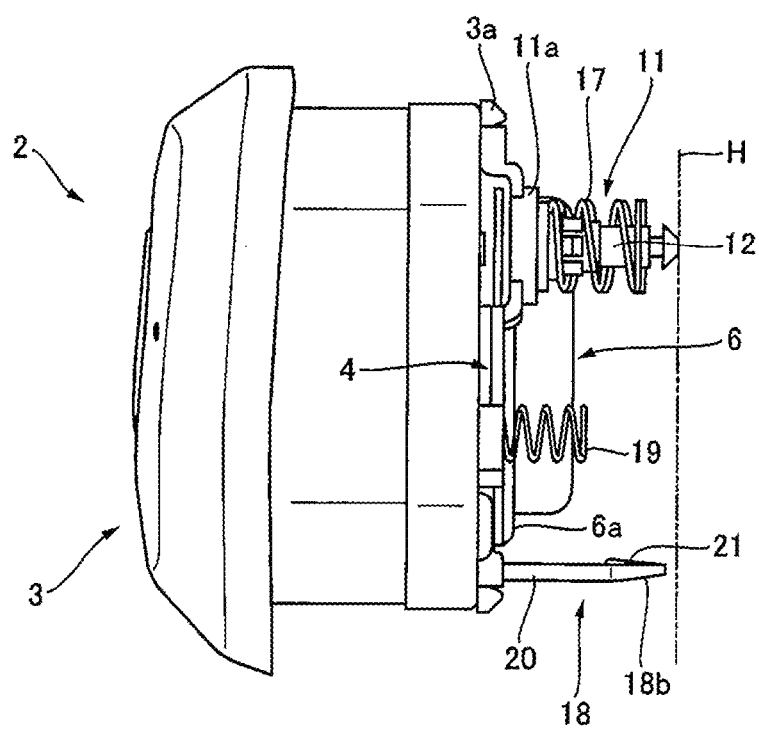

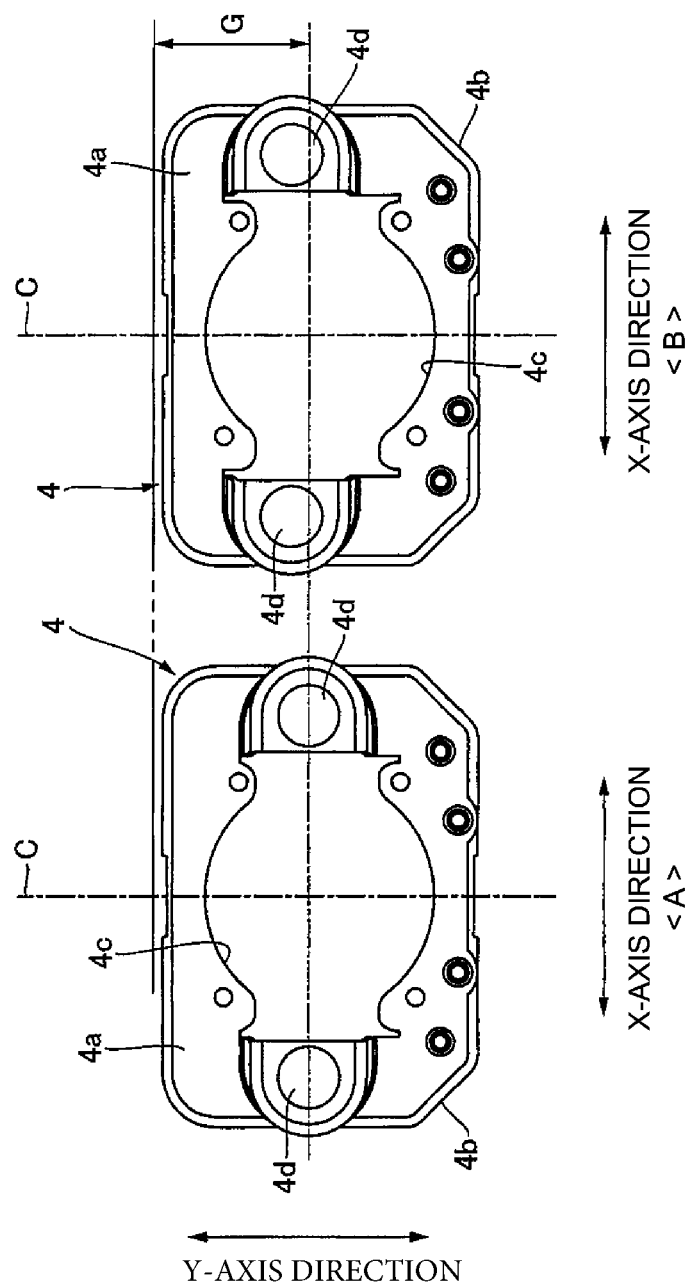

[FIG. 21]
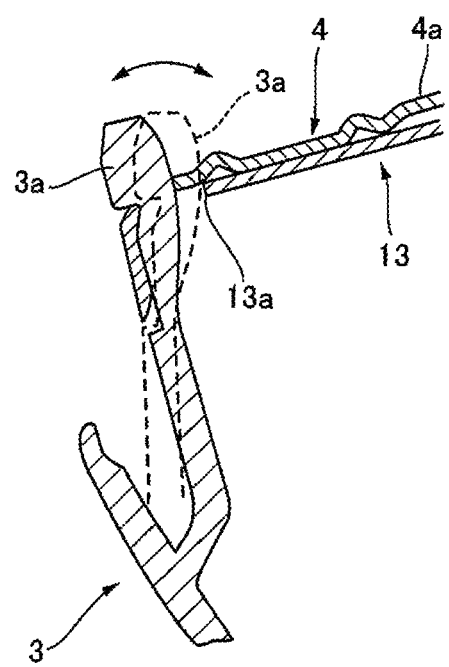

DAMPER MECHANISM OF STEERING WHEEL AND STEERING WHEEL APPARATUS FOR VEHICLE

CROSS-REFERENCE TO RELATED APPLICATIONS

This application claims the benefit of Japanese Patent Application No. 2018-131806, filed Jul. 11, 2018, Japanese Patent Application No. 2018-150732, filed Aug. 9, 2018 and Japanese Patent Application No. 2019-087698, filed May 7, 2019, the disclosure of which are herein incorporated by reference in their entirety.

TECHNICAL FIELD

The present invention relates to a damper mechanism of a steering wheel and a steering wheel apparatus for a vehicle in which it is possible to ensure a damping effect comparable to that of the known art and to decrease an airbag module in size so as to achieve a reduction in cost.

BACKGROUND

In the known art, Patent Document 1 is known, regarding a technology having a configuration in which a damper unit that damps vibration of a steering wheel is assembled between the steering wheel and an airbag module functioning as a damper mass.

In a "steering wheel apparatus" of Patent Document 1, the steering wheel includes a boss region, the airbag module that is installed in the boss region and also functions as a horn switch, a plurality of holes provided in a back surface of a housing of the airbag module, a damper that is joined to an inner edge of each of the holes at an inner side thereof, and a rod-shaped pin of which one end is inserted to each of the holes and is joined to the damper installed in each of the holes and the other end is connected to the boss region. The damper is configured to absorb vibration with an elastic force thereof between the boss region and the airbag module, the vibration being transmitted from a steering shaft during traveling of a vehicle, and further to push the airbag module, which is released from a driver during a horn operation, back to an initial position before the driver pushes the airbag module.

Three dampers are provided in a manner in which two dampers are installed closer to both sides in a right-left direction of the airbag module installed in the boss region, based on a neutral position of the steering wheel, and one damper is installed closer to a lower side at the center of the airbag module in the right-left direction, and thus the dampers are disposed at every vertex of an inverted isosceles triangle.

RELATED ART DOCUMENTS

Patent Documents

[Patent Document 1] JP 2015-71402 A

SUMMARY OF THE INVENTION

Problem to be Solved by the Invention

A unit type of damper has a cylindrical part having a large outer dimension, and thus each damper is large in size. Hence, it is necessary to provide a large space in order to install three dampers. Therefore, an airbag module configured to install three dampers increases in size.

Additionally, the three dampers are disposed at every vertex of an isosceles triangle, and one damper is attached to a lower side of the airbag module. Hence, a dimension of the airbag module is likely to increase in an up-down direction. Further, a use of the three unit-type dampers results in an increase in cost.

The invention is made with consideration for such problems described above in the known art, and an object thereof is to provide a damper mechanism of a steering wheel and a steering wheel apparatus for a vehicle in which it is possible to ensure a damping effect comparable to that of the known art and to decrease an airbag module in size so as to achieve a reduction in cost.

Means for Solving the Problem

A damper mechanism of a steering wheel according to the invention includes: one or two damper units that are provided between the steering wheel and an airbag module functioning as a damper mass and damp vibration of the steering wheel; and an engaging mechanism that is provided in parallel with the damper unit, between the steering wheel and the airbag module, and holds the steering wheel and the airbag module in a relatively displaceable manner.

Preferably, the engaging mechanism has a hook portion. Desirably, the engaging mechanism configures a plate-shaped damper which damps vibration of the steering wheel. Preferably, the plate-shaped damper is formed of a synthetic resin material by resin molding.

Desirably, the airbag module includes a synthetic resin housing which holds the damper unit, and the plate-shaped damper is integrally formed to the housing by resin molding. Preferably, the damper unit has a sleeve which holds an elastic body, and the sleeve is integrally formed to the synthetic resin housing and the plate-shaped damper.

Desirably, the airbag module includes a metal housing which holds the damper unit, and the plate-shaped damper is integrally formed to the housing by overmold-resin molding.

Preferably, the airbag module includes a metal housing which holds the damper unit and configures a horn contact point which comes into contact with and is separated from a horn contact point at a side of the steering wheel, and the plate-shaped damper is formed of an insulating synthetic resin material and is attached to the housing.

Desirably, the damper unit has a sleeve which holds an elastic body, and the sleeve is integrally formed to the housing.

Preferably, the plate-shaped damper includes a leaf spring which has a joining portion that is joined to the airbag module and a fitting portion with respect to the steering wheel, and the leaf spring is elastically bendable and deformable between the fitting portion and the joining portion.

Desirably, the damper unit is installed on the airbag module and has a pin which is to be attached to the steering wheel, and the pin projects more than the fitting portion to be attached to the steering wheel before the fitting portion.

Preferably, the fitting portion has an elastic piece configured to come into elastic contact with the steering wheel.

Desirably, the fitting portion has a holder which holds the plate-shaped damper on the steering wheel. Preferably, when the elastic piece is in contact with the steering wheel, a gap is formed between the holder and the steering wheel.

Desirably, the airbag module includes an inflator, the housing having an inflator attaching surface, and a horn cover which covers the inflator from an opposite side of the inflator attaching surface, and the joining portion of the plate-shaped damper is joined to the housing at a position closer to the horn cover than to the inflator attaching surface.

Preferably, the plate-shaped damper includes a leaf spring which has a joining portion that is joined to the steering wheel and a fitting portion with respect to the airbag module, and the leaf spring is elastically bendable and deformable between the fitting portion and the joining portion.

Desirably, the damper unit is installed on the steering wheel and has a pin which is to be attached to the airbag module, and the pin projects more than the fitting portion to be attached to the airbag module before the fitting portion.

Preferably, the fitting portion has an elastic piece configured to come into elastic contact with the airbag module.

Desirably, the fitting portion has a holder which holds the plate-shaped damper on the airbag module. Preferably, when the elastic piece is in contact with the airbag module, a gap is formed between the holder and the airbag module.

Desirably, the damper mechanism of a steering wheel further includes an elastic-support member that is provided in parallel with the plate-shaped damper, between the steering wheel and the airbag module.

Preferably, the plate-shaped damper includes an integrally formed insulating sheet portion, and the housing includes a metal elastic-support member which is provided in parallel with the plate-shaped damper, between the steering wheel and the airbag module, the metal elastic-support member being provided to the housing via the insulating sheet portion.

Desirably, the airbag module includes an attachment plate to which the housing, to which an inflator is attached and fixed, and a horn cover that covers the inflator are attached and fixed, and the insulating sheet portion is temporarily fixed to the attachment plate by adjoining the housing and is fixed by attachment of the attachment plate and the housing.

Preferably, the damper unit is disposed at a center of the airbag module in an up-down direction, based on a neutral position of the steering wheel. Desirably, the damper unit is disposed closer to an upper end side from a center of the airbag module in an up-down direction, based on a neutral position of the steering wheel. Preferably, when the two damper units are provided, the two damper units are disposed closer to both sides of the airbag module in a right-left direction, based on a neutral position of the steering wheel.

Desirably, the plate-shaped damper is disposed closer to a lower side of the steering wheel in an up-down direction, based on a neutral position of the steering wheel.

A steering wheel apparatus for a vehicle according to the invention includes the damper mechanism of a steering wheel described above.

Effects of the Invention

In a damper mechanism of a steering wheel and a steering wheel apparatus for a vehicle according to the invention, it is possible to ensure a damping effect comparable to that of the known art and to decrease an airbag module in size so as to achieve a reduction in cost.

BRIEF DESCRIPTION OF THE DRAWINGS

FIG. 1 is an entire perspective view schematically illustrating an example of a steering wheel apparatus for a vehicle to which a damper mechanism of a steering wheel according to the invention that is applied.

FIG. 2 is a side view illustrating a first embodiment of the damper mechanism of a steering wheel and the steering wheel apparatus for a vehicle according to the invention.

FIG. 3 is a perspective view of an airbag module of the damper mechanism of a steering wheel illustrated in FIG. 2, when viewed from a side of a housing.

FIG. 4 is a perspective view of a state in which a plate-shaped damper of the damper mechanism of a steering wheel illustrated in FIG. 2 is provided between the airbag module and the steering wheel, when viewed from a side of a horn cover of the airbag module.

FIG. 5 is a partial perspective view of the airbag module of the damper mechanism of a steering wheel illustrated in FIG. 2.

FIG. 6 is a perspective view illustrating an example of the plate-shaped damper of the damper mechanism of a steering wheel illustrated in FIG. 2.

FIG. 7 is a partial cross-sectional view taken along line A-A in FIG. 6.

FIG. 8 is a main-part enlarged perspective view illustrating a state before the plate-shaped damper illustrated in FIG. 6 is held by the steering wheel.

FIG. 9 is a main-part enlarged perspective view illustrating a state after the plate-shaped damper illustrated in FIG. 8 is held by the steering wheel.

FIG. 10 is a side view illustrating an attachment operation of the plate-shaped damper to the steering wheel illustrated in FIG. 6.

FIG. 11 is a side view illustrating a detachment operation of the plate-shaped damper from the steering wheel illustrated in FIG. 10.

FIG. 12 is a perspective view illustrating a modification example of an engaging structure of the plate-shaped damper of the damper mechanism of a steering wheel illustrated in FIG. 2 to a side of an airbag unit.

FIG. 13 is a view depicting another modification example of the engaging structure of the plate-shaped damper of the damper mechanism of a steering wheel illustrated in FIG. 2 to a side of the airbag unit, FIG. 13(A) is a perspective view illustrating a state before engagement, and FIG. 13(B) is a cross-sectional view illustrating a state after the engagement.

FIG. 14 is a perspective view of an airbag module included in a second embodiment of the damper mechanism of a steering wheel and the steering wheel apparatus for a vehicle according to the invention.

FIG. 15 is a partial perspective view of the airbag module of the damper mechanism of a steering wheel illustrated in FIG. 14.

FIG. 16 is a perspective view of an airbag module included in a third embodiment of the damper mechanism of a steering wheel and the steering wheel apparatus for a vehicle according to the invention.

FIG. 17 is a perspective view of an airbag module included in a fourth embodiment of the damper mechanism of a steering wheel and the steering wheel apparatus for a vehicle according to the invention.

FIG. 18 is a plan view of a plate-shaped damper included in the airbag module illustrated in FIG. 17.

FIG. 19 is a side view of an airbag module illustrating a modification example of disposition of a pin and the plate-shaped damper which are applicable to the embodiments of the damper mechanism of a steering wheel and the steering wheel apparatus for a vehicle according to the invention.

FIG. 20 is a view depicting disposition of a damper unit of the damper mechanism of a steering wheel illustrated in FIGS. 2, 14, 16, and 17, FIG. 20(A) is a view illustrating a case where the damper unit is disposed at a center of the airbag module in an up-down direction, based on a neutral position of the steering wheel, and 20(B) is a view illustrating a case where the damper unit is disposed closer to an upper end side from the center of the airbag module in the up-down direction, based on the neutral position thereof.

FIG. 21 is a main-part cross-sectional view illustrating an attachment structure to an attachment plate of a horn cover which is applicable to the damper mechanism of a steering wheel and the steering wheel apparatus for a vehicle according to the invention.

DESCRIPTION OF THE PREFERRED EMBODIMENT

Hereinafter, preferred embodiments of a damper mechanism of a steering wheel and a steering wheel apparatus for a vehicle according to the invention will be described in detail with reference to accompanying drawings. FIGS. 1 and 2 are views schematically illustrating a steering wheel 1 of the steering wheel apparatus for a vehicle to which the damper mechanism of a steering wheel according to the invention is applied.

FIG. 1 illustrates a perspective view of the entire steering wheel 1, and FIG. 2 illustrates a cross-sectional side view. Incidentally, in the following drawings including FIG. 1, directions are illustrated, on the assumption that a steering position of the steering wheel 1 attached to a vehicle is in a neutral position. For example, a Z axis is set to have a downward side in a front wheel direction of a vehicle on a steering column (steering shaft) (not illustrated) and an upward side in a direction toward the steering wheel 1.

In addition, in a plane orthogonal to the Z axis, an X axis is set from a 9-o'clock direction (left direction) toward a 3-o'clock direction (right direction), and a Y axis is set from a 6-o'clock direction (rear direction) toward a 12-o'clock direction (forward direction), with a position of 12 o'clock of an analog 12-hour clock as a front side of a vehicle. Alternatively, a side viewed from a side of a driver is referred to as a front side, and an opposite side thereof is referred to as a back side.

The steering wheel 1 is installed at a driver seat of a vehicle to be connected to the steering shaft that penetrates an inside of the steering column (not illustrated) and transmit an operation force of a driver to a steering gear or the like.

An airbag module 2 that functions as a front airbag in an emergency is attached at a center of the steering wheel 1. Although the description is omitted, the airbag module 2 also functions as a horn switch that a driver pushes when ringing a horn, in normal times.

The airbag module 2 at a side of a driver is covered with a resin horn cover 3 which functions as a designed face. A tray-shaped housing 4 is provided at the back of the horn cover 3. An airbag cushion 5 that is unfolded to expand in an emergency is folded to be accommodated inside the horn cover 3. An inflator 6 provided to be accommodated in the airbag cushion 5 is attached to the housing 4.

When a signal is transmitted from a sensor of a vehicle in an emergency, an inflator gas is supplied from the inflator 6 to the airbag cushion 5, and the airbag cushion 5 tears open the horn cover 3 to be unfolded to expand in a vehicle interior space and restrains a driver.

A base part of the steering wheel 1 is configured of a metal cored bar member 7. The cored bar member 7 is largely configured to include a central boss region 8, a circular rim 9 that a driver grips, and a spoke 10 that connects the boss region 8 and the rim 9. The steering shaft is connected to the boss region 8.

The airbag module 2 functions as a horn switch as described above and further as a module damper mechanism that attenuates vibration, as well as functioning as a front airbag. Configurational elements that realize the function as the horn switch and the module damper mechanism will be described below.

A structure of the airbag module 2 included in a first embodiment of the damper mechanism of a steering wheel and the steering wheel apparatus for a vehicle according to the invention is briefly described with reference to FIGS. 3 to 5. The airbag module 2 is configured to include: a metal housing 4 that is formed into a tray shape, in which a peripheral wall 4b is formed around a bottom surface functioning as an inflator attaching surface 4a, and that has an inflator inserting hole 4c at a center of the housing and two damper units attaching through-holes 4d at both sides of the housing; two damper units 11 that are mounted in the through-holes 4d; a metal pin 12 that is inserted from the housing 4 toward the boss region 8 to be slidable in the damper unit 11; an inflator 6 that is provided to be inserted into the inflator inserting hole 4c from an opposite side (side of the cored bar member 7) of the peripheral wall 4b such that an outer peripheral flange 6a abuts the inflator attaching surface 4a of the housing 4; a metal attachment plate 13 that is installed to adjoin the pin 12 from a side of the peripheral wall 4b and is accommodated in the housing 4; a metal retainer ring 14 that has a bolt 14a and overlaps the attachment plate 13 from the side of the peripheral wall 4b, in which the bolt 14a penetrating the attachment plate 13, the bottom surface 4a of the housing 4, and the outer peripheral flange 6a of the inflator 6 is fastened with a nut 15 such that the inflator 6 or the like is fixed to the housing 4; and a synthetic resin horn cover 3 that accommodates the airbag cushion 5, is provided to cover the inflator 6 or the like from an opposite side of the bottom surface of the inflator attaching surface 4a, and has an opening peripheral edge which is secured to the peripheral wall 4b of the housing 4 with a rivet 16.

The pin 12 that projects from the bottom surface 4a of the housing 4 has a horn spring (coil spring) 17 which surrounds the pin. In addition, two metal coil springs 19 which are elastic-support members are provided on the bottom surface 4a of the housing 4 at an opposite side of the peripheral wall 4b, with a plate-shaped damper 18 interposed between the springs from both sides along an X-axis direction. The coil springs 19 are provided between the cored bar member 7 and the airbag module 2 (housing 4).

As illustrated in FIGS. 2 to 5, in the airbag module 2, one or two (two in the drawings) damper units 11 are arranged in the housing 4. The damper unit 11 is a member that elastically attaches the housing 4 to the cored bar member 7 and is central to the module damper mechanism.

As illustrated in FIG. 20(A), the two damper units 11 are disposed at a center in an up-down direction of the airbag module 2 (housing 4) in the up-down direction (Y-axis direction), based on a neutral position of the steering wheel 1.

In addition, the damper units 11 are disposed closer to both right and left sides in a right-left direction of the airbag module 2 (housing 4) in the right-left direction (X-axis direction), based on the neutral position of the steering wheel 1. Preferably, the two damper units 11 are disposed at an equal distance from a central axis C in the right-left direction of the airbag module 2 (housing 4).

The rod-shaped pin 12 projects from the damper unit 11 toward the boss region 8 of the cored bar member 7 in the Z-axis direction (refer to FIG. 2). The pin 12 is fixed to the cored bar member 7, and thereby the steering wheel 1 and the airbag module 2 are connected to each other. Hence, the damper units 11 that inhibit vibration of the steering wheel 1 are disposed between the airbag module 2 and the steering wheel 1.

As illustrated in FIG. 3, the pin 12 is inserted into the cored bar member 7 through a coil-shaped horn spring 17. The horn spring 17 is installed between the airbag module 2 and the cored bar member 7 to ensure a gap therebetween. Hence, the airbag module 2 released from a pressing operation (refer to an arrow B in FIG. 2) performed by a driver during a horn operation is separated from the cored bar member 7 to return to an original position.

To briefly describe, the damper unit 11 is configured to have an annular synthetic resin sleeve that covers and holds a ring-shaped elastic body for damping vibration, and the pin 12 of the damper unit 11 is slidably inserted into the elastic body.

The sleeve is attached to the through-hole 4d formed in the housing 4 that configures the airbag module 2, and thereby the damper unit 11 is fixed to the airbag module 2.

The airbag module 2 is provided with respect to the steering wheel 1 to be slidable toward the side of the steering wheel 1 via the pin 12 in a state in which the airbag module is elastically supported by the damper unit 11 having the elastic body.

The vibration of the steering wheel 1 is transmitted to the damper unit 11 via the pin 12, and the transmitted vibration is attenuated in the damper unit 11 that uses the airbag module 2 as the damper mass.

Regarding a horn function, when the airbag module 2 is pressed to proceed toward the steering wheel 1, the damper unit 11 provided on the airbag module 2 slides with respect to the pin 12, and the horn spring 17 is compressed. Consequently, contact points (not illustrated) provided both the side of the airbag module 2 and the side of the steering wheel 1 are electrically conducted, and a horn rings.

When pressing of the airbag module 2 is cancelled, the horn spring 17 is elastically restored such that the airbag module 2 is retracted, and thereby the contact points are separated from each other such that ringing is to be stopped.

As illustrated in FIGS. 2 to 5, the plate-shaped damper 18 as an engaging mechanism that holds the steering wheel 1 and the airbag module 2 in a relatively displaceable manner is provided in parallel with the damper unit 11, between the cored bar member 7 of the steering wheel 1 and the housing 4 of the airbag module 2.

To be more specific, relative displacement means a change in separation distance between the steering wheel 1 and the airbag module 2 due to vibration of the steering wheel 1 and damping by the damper unit 11, and the engaging mechanism is configured to allow the change in distance.

The plate-shaped damper 18 is disposed closer to a lower side of the steering wheel 1 in the up-down direction (Y-axis direction), based on the neutral position of the steering wheel 1. In a positional relationship with the damper units 11, the plate-shaped damper is disposed closer to a lower side (6-o'clock side) than the damper units 11 at a center of the two damper units 11.

Hence, the damper units 11 and the plate-shaped damper 18 are provided to be disposed at the vertexes of an inverted isosceles triangle with respect to the airbag module 2. In addition, the two coil springs 19 described above are arranged at both right and left sides of the plate-shaped damper 18 along the X-axis direction.

As illustrated in FIGS. 6 and 7, the plate-shaped damper 18 is configured to have a (metal or synthetic resin) leaf spring 20 as a principal member and an elastic piece 21 that is attached to the leaf spring. The plate-shaped damper 18 transmits vibration from the steering wheel 1 to the airbag module 2 by an elastic action of the plate-shaped damper and damps the vibration (mainly vibration in the Y-axis direction) of the steering wheel 1 by the elastic action due to plate bending in cooperation with the airbag module 2 functioning as the damper mass.

The plate-shaped damper 18 may be made of metal such as steel or stainless steel or may be formed of a synthetic resin material by resin molding. Examples of the synthetic resin material include preferably nylon 66 or glass-compounded nylon 66, polypropylene (PP), and polyacetal (POM).

In a case of using the housing 4 made of a synthetic resin, the housing and the plate-shaped damper 18 can be integrally molded, and the sleeve, the housing 4, and the plate-shaped damper 18 can also be integrally molded.

In a state illustrated in FIG. 6, the plate-shaped damper 18 is configured to have a joining portion 18a at an upper end portion side thereof and a fitting portion at a lower end portion side thereof along an up-down length direction (Z-axis direction). The joining portion is joined to the housing 4 of the airbag module 2, and the fitting portion with respect to the steering wheel 1 has an elastic piece 21 to be described below in the first embodiment and has a holder 18b that is held to a support bar 22 formed on the cored bar member 7 of the steering wheel 1.

To be more specific, as illustrated in FIG. 6, the joining portion 18a of the plate-shaped damper 18 has a small hole 24 into which a rivet 23 is hammered, and a window portion 25 is formed between the joining portion 18a and the holder 18b. As illustrated in FIG. 7, a crosspiece 26 below the window portion 25 has an insertion hole 27 into which the elastic piece 21 is pressed to be attached, and a recessed cutout portion 28 is formed below the crosspiece 26.

The joining portion 18a comes into bump contact with the peripheral wall 4b of the housing 4 and is joined to the housing 4 with the rivet 23. The peripheral wall 4b of the housing 4 is formed to be upright from the bottom surface functioning as the inflator attaching surface 4a, and the joining portion 18a is joined to the housing 4 at a position closer to a side of the horn cover 3 than to the inflator attaching surface 4a in a location or the like in which the horn cover 3 is secured with the rivet 16.

A pair of holders 18b is formed in a state of being extended toward a thickness direction of the leaf spring 20 from both edges in a width direction of a plate surface of the leaf spring 20 to one side.

The holder 18b has a tapered edge portion from an upper end that is largely extended from the plate surface toward a lower end that is not extended in the thickness direction, along an up-down length direction of the leaf spring 20, the tapered edge portion functioning as a slide guide 29 and the largely extended upper end functioning as a hook 30.

The holder 18b is formed by bending the plate-shaped damper 18 configured of the leaf spring 20 as a principal member and is formed to include the plate-shaped hook 30 as illustrated in the drawing.

The plate-shaped damper 18 can restorably perform plate bending deformation by elasticity of the leaf spring 20, between the holder 18b and the joining portion 18a.

The elastic piece 21 is formed of a rubber material such as ethylene propylene diene rubber (EPDM), silicone rubber, nitrile rubber (NBR), a synthetic resin material such as nylon 66, glass-compounded nylon 66, polypropylene (PP), polyacetal (POM), or the like.

The elastic piece 21 is configured to have a main body portion 21a which appears on a side of the holder 18b of the plate-shaped damper 18, an insertion portion 21b which protrudes from the main body portion 21a and is inserted into the insertion hole 27, and a lock portion 21c which protrudes from the insertion portion 21b and is locked to the crosspiece 26 at an opposite side of the main body portion 21a so as to fix the elastic piece 21 to the leaf spring 20, the main body portion, the insertion portion, and the lock portion being integrally molded. An upper end of the main body portion 21a has a collar 21d that covers a lower edge of the window portion 25.

The lock portion 21c is pushed into the leaf spring 20 via the insertion hole 27 such that the insertion portion 21b is positioned in the insertion hole 27, and thereby the elastic piece 21 is attached to the leaf spring. The elastic piece 21 is disposed to be interposed between the pair of holders 18b. The main body portion 21a is attached to the leaf spring 20 such that a height position of the collar 21d is the same as or approximate to a height position of the hook 30.

As illustrated in FIGS. 4 and 8 to 11, the plate-shaped damper 18 having the elastic piece 21 is held by the support bar 22 of the cored bar member 7 of the steering wheel 1. The support bar 22 is provided to intersect in a transverse orientation with respect to the up-down length direction of the leaf spring 20 in which the joining portion 18a and the holder 18b are formed.

The support bar 22 projects more in the up-down length direction of the leaf spring 20 at a location corresponding to the elastic piece 21, compared to locations corresponding to the pair of holders 18b of the plate-shaped damper 18, and a projecting step portion 22a is formed.

A positional relationship (dimensional relationship) between the support bar 22, the holder 18b of the plate-shaped damper 18, and the elastic piece 21 is described. When the plate-shaped damper 18 is attached to the support bar 22, the slide guide 29 comes into bump contact with the support bar 22 from above in the up-down length direction of the leaf spring 20, as illustrated in FIG. 8.

In this case, a thickness of the main body portion 21a of the elastic piece 21 in the thickness direction of the leaf spring 20 is set to a thickness dimension by which the main body portion does not come into contact with the step portion 22a. On the other hand, an upward projecting dimension of the step portion 22a is set to a dimension by which the step portion does not come into contact with the main body portion 21a.

Further, an extending dimension of the slide guide 29 is set to a dimension by which the slide guide does not come into contact with the step portion 22a and the main body portion 21a, when the slide guide comes into bump contact with the support bar 22.

When the slide guide 29 moves downward, extension of the holder 18b gradually increases, and thus the main body portion 21a does not come into bump contact with the step portion 22a. Then, as illustrated in FIG. 9, the slide guide 29 is interrupted such that the hook 30 of the holder 18b enters a space under the support bar 22.

When the hook 30 enters the space under the support bar 22, the collar 21d comes into contact with the step portion 22a from below, and a gap D is formed between the hook 30 of the holder 18b and the support bar 22. In addition, setting is performed to maintain a gap between the leaf spring 20 and the support bar 22.

To be more specific, a thickness of the main body portion 21a of the elastic piece 21 in the thickness direction of the leaf spring 20 is set to a thickness dimension by which the main body portion comes into contact with the step portion 22a from below, and a gap is formed between the leaf spring 20 and the support bar 22. In addition, a downward projecting dimension of the step portion 22a is set to a dimension by which the gap D is formed between the hook 30 and the support bar 22, when the collar 21d is in contact with the step portion 22a.

In short, a dimension of the plate-shaped damper 18 is set such that only the elastic piece 21 at the side of the airbag module 2 can come into elastic contact with the support bar 22 at the side of the steering wheel 1. The plate-shaped damper 18 includes the hook 30, thereby, being able to be reliably held by the steering wheel 1.

FIG. 10 illustrates an attachment operation of the plate-shaped damper, and FIG. 11 illustrates a detachment operation.

When the plate-shaped damper 18 joined to the airbag module 2 by the joining portion 18a is pushed downward (refer to an arrow E in the drawing) in a state in which the slide guide 29 of the holder 18b comes into bump contact with the support bar 22 of the steering wheel 1, the leaf spring 20 is elastically bent and deformed, as illustrated in FIG. 10.

Then, when the hook 30 of the holder 18b reaches a position below the support bar 22, the leaf spring 20 is elastically restored, and the hook 30 enters a space under the support bar 22. Consequently, the plate-shaped damper 18 is attached to and held by the support bar 22.

On the other hand, as illustrated in FIG. 11, when the plate-shaped damper 18 is pressed (refer to an arrow F in the drawing) such that the hook 30 is separated from space under the support bar 22 when the plate-shaped damper is detached from the steering wheel 1, and when the leaf spring 20 is elastically deformed to be pulled upward as is, the slide guide 29 comes into bump contact with the support bar 22 and is pulled more upward, thereby, being separated from the support bar 22.

Operations of the damper mechanism of a steering wheel and the steering wheel apparatus for a vehicle according to the first embodiment are described. The plate-shaped damper 18 has the engaging mechanism, that is, the engaging mechanism as a specific example, which is provided in parallel with the damper unit 11, between the steering wheel 1 and an airbag module 2 and holds the steering wheel 1 and the airbag module 2 in a relatively displaceable manner. In this manner, the engaging mechanism can stably hold the airbag module 2 with respect to the steering wheel 1, and it is possible to cause the damper unit 11 to appropriately and sufficiently exhibit its performance to ensure a high damping effect of the vibration of the steering wheel 1.

The engaging mechanism has the hook 30 formed into a plate shape, and the hook 30 holds the steering wheel 1 and the airbag module 2 in a relatively displaceable manner. Hence, it is possible to configure the engaging mechanism with high productivity and a good attachment property. It is needless to say that as the engaging mechanism, instead of the hook 30, a known tab member having flexibility which is used to attach a curtain airbag to a roof-side rail may be used by being hung or the like on the support bar 22 of the steering wheel 1.

Since the plate-shaped damper 18 has a plate shape literally, the plate-shaped damper is compact, and instead of one damper unit 11, for example, the plate-shaped damper is disposed in parallel with the other damper unit 11. In this manner, it is possible to decrease the airbag module 2 in size.

In addition, since the plate-shaped damper 18 is disposed in place of the damper unit 11, it is possible to achieve a reduction in cost.

The plate-shaped damper 18 connects the steering wheel 1 and the airbag module 2 to each other, and thus the vibration of the steering wheel 1 can be attenuated by the plate-shaped damper 18 that uses the airbag module 2 as the damper mass. Hence, it is possible to ensure the damping effect comparable to that of the known art with the other damper unit 11.

The plate-shaped damper 18 is configured to have the leaf spring 20 and can damp the vibration (mainly vibration in the Y-axis direction) of the steering wheel 1 by the elastic operation due to plate bending which is promoted by the leaf spring 20.

Elasticity of the leaf spring 20 is adjusted, and thereby it is possible to adjust an attenuating vibration frequency.

In addition, the leaf spring 20 is elastically bent and deformed, and thereby it is possible to perform attachment of the plate-shaped damper 18 to the steering wheel 1.

In addition, the plate-shaped damper 18 is disposed closer to a lower side (6-o'clock side in the Y-axis direction) of the airbag module 2 in the up-down direction, and thus it is possible to decrease a dimension of the airbag module 2 in the up-down direction.

The plate-shaped damper 18 has the rubber or synthetic resin elastic piece 21 that can come into elastic contact with the support bar 22 of the steering wheel 1 and transmits the vibration of the steering wheel 1 to the side of the airbag module 2 via the elastic piece 21. Hence, it is possible to adjust the attenuating vibration frequency by hardness of the elastic piece 21 and a period of contact of the elastic piece 21 with the support bar 22.

In addition, it is also possible to adjust the attenuating vibration frequency by adjusting the hardness of the elastic body of the damper unit 11.

When the elastic piece 21 is in contact with the support bar 22, the gap D is to be formed between the hook 30 of the holder 18b and the support bar 22. Hence, it is possible to prevent abnormal noise from occurring due to the vibration of the steering wheel 1.

A joining position of the joining portion 18a of the plate-shaped damper 18 to the housing 4 is set to a position closer to the horn cover 3 than to the inflator attaching surface 4a, and thus a joining operation is simple. In addition, it is possible to match occurrence positions of attenuating operations by the damper unit 11 and the plate-shaped damper 18.

The coil springs 19 are provided in parallel with the plate-shaped damper 18, and thus it is possible to stably support a connection location of the steering wheel 1 to the airbag module 2 and a periphery of the connection location by the plate-shaped damper 18.

FIGS. 12 and 13 illustrate modification examples of an attachment structure of the plate-shaped damper 18 to the housing 4.

In FIG. 12, the joining portion 18a of the plate-shaped damper 18 is to be joined to the peripheral wall 4b of the housing 4 by spot welding 31.

FIG. 13(A) is a perspective view depicting a state before the plate-shaped damper 18 is attached, and FIG. 13(B) is a cross-sectional side view illustrating an attachment operation.

The housing 4 has a window hole 32 formed to have a wide portion 32a and a narrow portion 32b in a series up and down in a height direction of the peripheral wall 4b. The housing 4 has a penetrating hole 33 that the leaf spring 20 with the elastic piece 21 attached penetrates, the penetrating hole being formed corresponding to a position of the window hole 32, in the inflator attaching surface 4a of the bottom surface. In this modification example, the holder 18b is not provided.

The joining portion 18a of the plate-shaped damper 18 has an overhang portion 34 that is to straddle the peripheral wall 4b of the housing 4 at an upper end, and a downward clip portion 35 is formed to be continuous to the overhang portion 34. The clip portion 35 is formed to have a narrow inserting portion 35a and a wide protruding portion 35b.

The leaf spring 20 penetrates the penetrating hole 33, the clip portion 35 penetrates the peripheral wall 4b from an outer side toward an inner side of the peripheral wall 4b via the window hole 32 such that the inserting portion 35a penetrates the narrow portion 32b and the protruding portion 35b penetrates the wide portion 32a.

Hence, when the leaf spring 20 is pushed down, the clip portion 35 pinches the peripheral wall 4b from the inner and outer sides, and thereby the joining portion 18a is to be joined to the housing 4.

It is needless to say that, also in the modification examples, the same effects as those of the first embodiment are achieved.

FIGS. 14 and 15 illustrate a second embodiment of the damper mechanism of a steering wheel and the steering wheel apparatus for a vehicle according to the invention.

In the first embodiment, the airbag module 2 has a configuration in which the metal housing 4 has the metal or synthetic resin plate-shaped damper 18. In the second embodiment, a housing 4 and a plate-shaped damper 18 are made of a synthetic resin.

The plate-shaped damper 18 is integrally formed to the housing 4 by resin molding. Specifically, the plate-shaped damper 18 is integrated to the housing 4 at the location of a joining portion 18a. Consequently, it is possible to achieve a reduction in the number of parts and in cost.

Damper units 11 are held to the housing 4 as described above. In an integral molding of the housing 4 and the plate-shaped damper 18 by resin molding, preferably, a synthetic resin sleeve 11a of the damper unit 11 is integrally formed to the housing 4 by resin molding. Consequently, it is possible to achieve a more reduction in the number of parts and in cost.

FIG. 15 illustrates a structure of an airbag module 2 included in the second embodiment. The airbag module 2 is configured to include: a synthetic resin housing 4 that has an inflator inserting hole 4c at a center thereof and two sleeves 11a at both sides thereof, the two sleeves being integrally molded to the housing; two damper units 11 configured to have an elastic body 11b which is mounted in the sleeve 11a; a metal pin 12 that is inserted from the housing 4 toward a boss region 8 to be slidable in the damper unit 11; an inflator 6 that is provided to be inserted into the inflator inserting hole 4c from a side of the cored bar member 7 such that an outer peripheral flange 6a abuts an inflator attaching surface 4a of the housing 4; a metal or synthetic resin attachment plate 13 that has a plurality of slits 13a, with which a horn cover 3 engages, in an outer peripheral edge, is installed to adjoin the inflator attaching surface 4a, and accommodates the housing 4 therein; a metal retainer ring 14 that has a bolt 14a and overlaps the attachment plate 13 from the side of the horn cover 3, in which the bolt 14a penetrating the attachment plate 13, the bottom surface 4a of the housing 4, and the outer peripheral flange 6a of the inflator 6 is fastened with a nut 15 such that the inflator 6 or the like is fixed to the housing 4; and a synthetic resin horn cover 3 that accommodates an airbag cushion 5, is provided to cover the inflator 6 or the like from an opposite side of the bottom surface of the inflator attaching surface 4a, and has a plurality of locking hook pieces 3a in an opening peripheral edge portion, the locking hook pieces being locked to the slits 13a of the attachment plate 13.

The other configurations thereof are the same as those of the first embodiment. It is needless to say that, also in the second embodiment, the same effects as those of the first embodiment are achieved.

FIG. 16 illustrates a third embodiment of the damper mechanism of a steering wheel and the steering wheel apparatus for a vehicle according to the invention. In the third embodiment, a housing 4 that holds a damper unit 11 is made of metal, and a plate-shaped damper 18 is integrally formed to the housing 4 by overmold-resin molding.

The plate-shaped damper 18 and the housing 4 are integrally formed, and thereby it is possible to achieve a reduction in the number of parts and in cost, similar to the second embodiment. The third embodiment can be configured in the same assembly as that of the second embodiment illustrated in FIG. 15.

The other configurations thereof are the same as those of the first and second embodiments. It is needless to say that, also in the third embodiment, the same effects as those of the embodiments are achieved.

FIGS. 17 and 18 illustrate a fourth embodiment of the damper mechanism of a steering wheel and the steering wheel apparatus for a vehicle according to the invention.

The fourth embodiment represents a case where a housing 4 that is assembled at a side of an airbag module 2 is made of metal having the conductivity, a pin 12 that is provided at a side of the steering wheel 1 is also made of metal having the conductivity, and the housing 4 and the pin 12 function as horn contact points which come into contact with and are separated from each other.

A horn cover 3 of the airbag module 2 which receives a bias force of a horn spring 17 is pressed toward a cored bar member 7, and thereby the housing 4 comes into contact with the pin 12. Consequently, a horn rings.

When the airbag module 2 (horn cover 3) is pushed by the horn spring 17 and returns to an original position, the housing 4 is separated from the pin 12 such that ringing is to be stopped.

In this case, a plate-shaped damper 18 that is attached to the housing 4 is formed of an insulating synthetic resin material.

In addition, in the embodiments described above, a metal elastic-support member 19 is to be provided in parallel with the plate-shaped damper 18, between the housing 4 and the cored bar member 7. When the housing 4 functions as the horn contact point, and conduction to the elastic-support member 19 occurs, it is not possible to ensure a horn function.

The fourth embodiment has a configuration in which the elastic-support member 19 is installed by using the plate-shaped damper 18 made of the insulating synthetic resin material.

As illustrated in FIG. 18, the joining portion 18a described above of the plate-shaped damper 18 has an insulating sheet portion 36 that is integrally formed thereto and is expanded to both sides in the X-axis direction. A pair of protrusions 36a is formed at both end sides of the insulating sheet portion 36.

Two elastic-support members 19 have one end that is fitted to each of the protrusions 36a and are provided to the housing 4 via the insulating sheet portion 36. Consequently, conduction by the elastic-support member 19 is cut off such that it is possible to ensure the horn function.

In the fourth embodiment, the plate-shaped damper 18 is configured of a member separated from the housing 4, unlike the second and third embodiments.

Attachment of the plate-shaped damper 18 is performed as follows. First, the insulating sheet portion 36 of the plate-shaped damper 18 adjoins the housing 4 to be temporarily fixed to an attachment plate 13, between the housing 4 at a side of an inflator 6 and the attachment plate 13 at the side of the horn cover 3.

Then, the joining portion 18a of the plate-shaped damper 18 including the insulating sheet portion 36 is sandwiched between the attachment plate 13 and the housing 4 in an operation of attaching the attachment plate 13 to the housing 4 (an operation of fastening the inflator 6 to a retainer ring 14), and thereby the plate-shaped damper 18 is to be fixed to the side of the housing 4.

As described above, according to the fourth embodiment, even in a case of using the housing 4 as the horn contact point, it is possible to assemble the plate-shaped damper 18 and the elastic-support member 19 with a reasonably small number of parts, at low costs, and through an easy operation.

FIG. 19 illustrates a modification example of disposition of the pin 12 and the plate-shaped damper 18, which is applicable to the embodiments described above. The modification example has a configuration in which it is possible to improve an attachment property of an airbag module 2 to a cored bar member 7, the airbag module being provided to have the pin 12 and the plate-shaped damper 18 assembled thereto.

A damper unit 11 that is installed at a side of the airbag module 2 has the pin 12 which is to be inserted into and attached to a boss region 8 of the steering wheel 1.

As illustrated by a virtual line H in the drawing, the pin 12 projects more than a fitting portion 18b so as to be attached to the cored bar member 7 before the fitting portion 18b.

A configuration in which attachment of the pin 12 to the cored bar member 7 is completed in advance is employed. In this manner, when an elastic piece 21 of the plate-shaped damper 18 engages with the side of the steering wheel 1, for example, the support bar 22, it is possible to inhibit positions of the pin 12 in a 3-o'clock direction and a 9-o'clock direction from shifting by an operation reaction force of engaging thereof, and it is possible to enhance accuracy of an attachment position of the damper unit 11.

In the embodiments and examples described above, as illustrated in FIG. 20(A), the damper units 11 are disposed at the center in the up-down direction (Y-axis direction) of the housing 4 of the airbag module 2, based on the neutral position of the steering wheel 1, and thus it is possible to easily adjust the attenuating vibration frequency.

However, as illustrated in FIG. 20(B), the damper units may be disposed closer to an upper end side from the center in the up-down direction (Y-axis direction) of the housing 4 of the airbag module 2, based on the neutral position of the steering wheel 1 (the drawing illustrating a shift of a position of a through-hole 4d with respect to a distance G from the center to an upper end of the housing 4 in the up-down direction).

FIG. 21 illustrates an example of the attachment structure of the horn cover 3 to the attachment plate 13.

The attachment plate 13 has a slit 13a into which a locking hook piece 3a of the horn cover 3 is inserted in a freely oscillating manner.

The inflator 6 is fastened to the retainer ring 14 with the nut 15, and thereby the attachment plate 13 overlaps the inflator attaching surface 4a of the housing 4. When the housing 4 and the attachment plate 13 overlap each other, a peripheral edge of the housing 4 is partially covered with the slit 13a.

Consequently, the locking hook piece 3a that is inserted into the slit 13a is pressed to a position represented by a solid line from a state represented by a dashed line and oscillation thereof is restricted by the peripheral edge of the housing 4.

Oscillation restriction of the locking hook piece 3a with respect to the attachment plate 13 causes the horn cover 3 to be attached to the attachment plate 13. Consequently, the nut 15 is only fastened to the bolt 14a of the retainer ring 14, and thereby it is possible to easily and smoothly fix the horn cover 3 to the attachment plate 13.

In the embodiments described above, a case where the two damper units 11 are disposed closer to both sides in the right-left direction (X-axis direction) of the airbag module 2, based on the neutral position of the steering wheel 1 is described; however, it is needless to say that a configuration in which one damper unit is provided may be employed.

In the embodiments described above, a case where the damper units 11 are provided at the side of the airbag module 2 (in the through-holes 4d of the housing 4) is described; however, the damper units may be provided at the side of the steering wheel 1.

In the embodiments described above, a case where the joining portion 18a of the plate-shaped damper 18 is joined to the side of the airbag module 2, and the holder 18b is held at the side of the steering wheel 1 is described; however, the joining portion 18a may be joined to the side of the steering wheel 1, and the holder 18b may be held at the side of the airbag module 2.

In a case of a configuration in which the damper unit 11 and the plate-shaped damper 18 are assembled to the side of the airbag module 2 from the side of the steering wheel 1, for example, it is possible to employ a configuration in which the plate-shaped damper 18 includes the leaf spring 20 which has the joining portion 18a that is joined to the steering wheel 1 and the fitting portion 18b with respect to the airbag module 2, and the leaf spring 20 is elastically bendable and deformable between the fitting portion 18b and the joining portion 18a.

In addition, it is possible to employ a configuration the damper unit 11 is installed on the steering wheel 1 and has the pin 12 which is to be attached to the airbag module 2, and the pin 12 projects more than the fitting portion 18b to be attached to the airbag module before the fitting portion 18b.

Further, it is desirable to employ a configuration in which the plate-shaped damper 18 has the elastic piece 21 which can come into elastic contact with the airbag module 2, a configuration in which the fitting portion has the holder 18b that holds the plate-shaped damper 18 to the airbag module 2, or a configuration in which, when the elastic piece 21 comes into contact with the airbag module 2, the gap D is formed between the holder 18b and the airbag module 2.

The damper mechanism of a steering wheel and the steering wheel apparatus for a vehicle described above are the preferred examples of the invention, and embodiments other than those can also be implemented or fulfilled in various types of methods. In particular, unless described otherwise in the specification of the application, the invention is not restricted to a shape, a size, configurational disposition, and the like of parts illustrated in detail in the accompanying drawings. In addition, expressions and terms used in the specification of the application are used for providing the description, and thus the invention is not limited thereto, unless particularly described otherwise.

REFERENCE NUMERALS

1 Steering wheel
2 Airbag module
3 Horn cover
4 Housing
4a Inflator attaching surface
6 Inflator
11 Damper unit
11a Sleeve
11b Elastic body
12 Pin
13 Attachment plate
18 Plate-shaped damper
18a Joining portion
18b Holder (fitting portion)
19 Coil spring
20 Leaf spring
21 Elastic piece
30 Hook
36 Insulating sheet portion
D Gap between elastic piece and support bar

The invention claimed is:

1. A damper mechanism of a steering wheel, comprising:
a damper unit that is provided between the steering wheel and an airbag module functioning as a damper mass and damping vibration of the steering wheel, wherein the damper unit comprises a pin and an elastic-support member; and
a plate-shaped damper that is provided in parallel with the damper unit, between the steering wheel and the airbag module, and holds the steering wheel and the airbag module in a relatively displaceable manner,
wherein the plate-shaped damper comprises:
a fitting portion to couple with the steering wheel;
a joining portion to couple with the airbag module; and
an elastic piece to come in elastic contact with the steering wheel,
wherein the airbag module includes a synthetic resin housing which holds the damper unit,
wherein the plate-shaped damper is integrally formed to the housing by resin molding, and
wherein the damper unit has a sleeve which holds an elastic body, and the sleeve is integrally formed to the synthetic resin housing and the plate-shaped damper.

2. The damper mechanism of a steering wheel according to claim 1,
wherein the fitting portion comprises a hook portion.

3. The damper mechanism of a steering wheel according to claim 1,
wherein the plate-shaped damper is formed of a synthetic resin material by resin molding.

4. The damper mechanism of a steering wheel according to claim 1,
wherein the plate-shaped damper includes a leaf spring, and wherein the leaf spring is elastically bendable and deformable between the fitting portion and the joining portion.

5. The damper mechanism of a steering wheel according to claim 1,
wherein the damper unit is installed on the airbag module and the pin is attached to the steering wheel, and
wherein the pin projects more from the airbag module than the fitting portion to be attached to the steering wheel before the fitting portion.

6. The damper mechanism of a steering wheel according to claim 1,
wherein the airbag module includes an inflator, the housing having an inflator attaching surface, and a horn cover which covers the inflator from an opposite side of the inflator attaching surface, and
wherein the joining portion of the plate-shaped damper is joined to the housing at a position closer to the horn cover than to the inflator attaching surface.

7. The damper mechanism of a steering wheel according to claim 1,
wherein the elastic-support member is provided in parallel with the plate-shaped damper, between the steering wheel and the airbag module.

8. The damper mechanism of a steering wheel according to claim 1,
wherein the damper unit is disposed at a center of the airbag module in an up-down direction, based on a neutral position of the steering wheel.

9. The damper mechanism of a steering wheel according to claim 1,
wherein the damper unit is disposed closer to an upper end side from a center of the airbag module in an up-down direction, based on a neutral position of the steering wheel.

10. The damper mechanism of a steering wheel according to claim 1,
wherein when two damper units are provided, the two damper units are respectively disposed closer to either side of the airbag module in a right-left direction, based on a neutral position of the steering wheel.

11. A steering wheel apparatus for a vehicle, comprising:
the damper mechanism of a steering wheel described in claim 1.

12. The damper mechanism of a steering wheel according to claim 1, wherein the plate-shaped damper is made of metal.

13. The damper mechanism of a steering wheel according to claim 1,
wherein the plate-shaped damper is configured to damp the vibration of the steering wheel.

14. The damper mechanism of a steering wheel according to claim 13,
wherein the plate-shaped damper is disposed closer to a lower side of the steering wheel in an up-down direction, based on a neutral position of the steering wheel.

15. The damper mechanism of a steering wheel according to claim 1,
wherein the fitting portion has a holder which holds the plate-shaped damper on the steering wheel.

16. The damper mechanism of a steering wheel according to claim 15,
wherein when the elastic piece is in contact with the steering wheel, a gap is formed between the holder and the steering wheel.

17. A damper mechanism of a steering wheel, comprising:
a damper unit that is provided between the steering wheel and an airbag module functioning as a damper mass and damping vibration of the steering wheel, wherein the damper unit comprises a pin and an elastic-support member; and
a plate-shaped damper that is provided in parallel with the damper unit, between the steering wheel and the airbag module, and holds the steering wheel and the airbag module in a relatively displaceable manner,
wherein the plate-shaped damper comprises:
a fitting portion to couple with the steering wheel;
a joining portion to couple with the airbag module; and
an elastic piece to come in elastic contact with the steering wheel,
wherein the airbag module includes a metal housing which holds the damper unit,
wherein the plate-shaped damper is integrally formed to the housing by resin-overmolding, and
wherein the damper unit has a sleeve which holds an elastic body, and the sleeve is integrally formed to the housing.

18. The damper mechanism of a steering wheel according to claim 17,
wherein the plate-shaped damper includes a leaf spring, and
wherein the leaf spring is elastically bendable and deformable between the fitting portion and the joining portion.

19. The damper mechanism of a steering wheel according to claim 17, wherein the plate-shaped damper is made of metal.

20. A damper mechanism of a steering wheel, comprising:
a damper unit that is provided between the steering wheel and an airbag module functioning as a damper mass and damping vibration of the steering wheel, wherein the damper unit comprises a pin and an elastic-support member; and
a plate-shaped damper that is provided in parallel with the damper unit, between the steering wheel and the airbag module, and holds the steering wheel and the airbag module in a relatively displaceable manner,
wherein the plate-shaped damper comprises:
a fitting portion to couple with the steering wheel;
a joining portion to couple with the airbag module; and
an elastic piece to come in elastic contact with the steering wheel,
wherein the airbag module includes a metal housing which holds the damper unit and configures a horn contact point which comes into contact with and is separated from a horn contact point at a side of the steering wheel,
wherein the plate-shaped damper is formed of an insulating synthetic resin material and is attached to the housing, and
wherein the plate-shaped damper includes an integrally formed insulating sheet portion, and the housing includes a metal elastic-support member which is provided in parallel with the plate-shaped damper, between the steering wheel and the airbag module, the metal elastic-support member being provided to the housing via the insulating sheet portion.

21. The damper mechanism of a steering wheel according to claim 20,
wherein the airbag module includes an attachment plate to which the housing, an inflator, and a horn cover that covers the inflator are attached and fixed, and wherein the insulating sheet portion is temporarily fixed to the attachment plate by adjoining the housing and is fixed by attachment of the attachment plate and the housing.

22. The damper mechanism of a steering wheel according to claim 20, wherein the plate-shaped damper includes a leaf spring, and wherein the leaf spring is elastically bendable and deformable between the fitting portion and the joining portion.

\* \* \* \* \*